United States Patent [19]
Sugata

[11] Patent Number: 5,988,959
[45] Date of Patent: Nov. 23, 1999

[54] SPINDLE SUPPORTING BOX STRUCTURE, A DAMPING STRUCTURE, A GAS SUPPLY RELATED DEVICE, AND A BALANCE CYLINDER GAS ACTUATED DEVICE FOR MACHINE TOOLS

[75] Inventor: Shinsuke Sugata, Hiroshima, Japan

[73] Assignee: Horkos Corp., Hiroshima-ken, Japan

[21] Appl. No.: 08/950,740

[22] Filed: Oct. 15, 1997

[30] Foreign Application Priority Data

Oct. 19, 1996 [JP] Japan .................................... 8-297460
Oct. 19, 1996 [JP] Japan .................................... 8-297461
Oct. 19, 1996 [JP] Japan .................................... 8-297462

[51] Int. Cl.$^6$ ...................................................... B23C 1/30
[52] U.S. Cl. .......................... 409/141; 408/143; 408/235; 409/191; 409/237
[58] Field of Search ..................... 408/143, 234, 408/235; 409/141, 190, 191, 235, 237

[56] References Cited

U.S. PATENT DOCUMENTS

| | | | |
|---|---|---|---|
| 3,580,133 | 5/1971 | Berthiez | 409/237 |
| 3,684,395 | 8/1972 | Nurakami | 409/237 |
| 3,707,333 | 12/1972 | Kitamura et al. | 409/237 |
| 4,657,455 | 4/1987 | Rogers et al. | 409/235 |
| 5,259,710 | 11/1993 | Charles | 409/235 |
| 5,388,935 | 2/1995 | Sheldon | 409/235 |
| 5,538,373 | 7/1996 | Kirkham | 409/235 |
| 5,556,242 | 9/1996 | Sheldon et al. | 409/201 |
| 5,662,568 | 9/1997 | Lindem | 409/235 |

Primary Examiner—Andrea L. Pitts
Assistant Examiner—Monica Smith
Attorney, Agent, or Firm—Lane, Aitken & McCann

[57] ABSTRACT

A spindle supporting box structure, wherein longitudinal parts forming both ends of lateral parts at each of right and left longitudinal side faces facing, with a spindle therebetween, in a direction almost perpendicular to longitudinal side faces facing in a front-back direction are formed by longitudinal tubular members having suitable flexural rigidity. A damping structure wherein required frameworks of structures are formed by tubular members and wherein concrete is filled in the tubular members and then solidified. As an alternative, a powdery damping material or a jelly damping material is airtightly sealed in the tubular members. An inner space of one or more of the tubular members is made into a gas pressurized tank wherein a balance cylinder is connected to the gas pressurized tank and wherein the gas in the gas pressurized tank directly acts on a cylinder chamber of the balance cylinder.

15 Claims, 11 Drawing Sheets

SPINDLE SUPPORTING BOX STRUCTURE, A DAMPING STRUCTURE, A GAS SUPPLY RELATED DEVICE, AND A BALANCE CYLINDER GAS ACTUATED DEVICE FOR MACHINE TOOLS

BACKGROUND OF THE INVENTION

The present invention relates to a damping structure, a spindle supporting box structure, a gas supply related device, and a balance cylinder gas actuated device for machine tools. The damping structure may be a general structure or a partial structure for machine tools.

A base as one unit of a structure for machine tools and a column as a box structure for supporting a spindle are designed to have little mechanical vibration in order to increase workability for machine tools.

Therefore, components of the base and column are thickened, or provided with reinforcing ribs to increase the rigidity thereof.

Especially in a column which supports a spindle to move up and down, keeping the rigidity of the column is important. A conventional example is shown in FIGS. 10A and 10B. FIG. 10A is a perspective view of a column to which a spindle is mounted so as to move up and down. FIG. 10B is a horizontal cross sectional view of the upper part of the column.

As shown in these figures, the column is generally formed by assembling plate members. Namely, flat plates 11$a$, are fixed to longitudinal side faces 11$a$, 11$b$, 11$c$, and 11$d$, respectively, and then connected with each other. Besides, longitudinal ribs 102 and lateral ribs 103 are fixed to the inside of each flat plate 101, thereby increasing the of the whole column rigidity.

Reference number 12 is a spindle device having a spindle 12$b$. The spindle device 12 comprises a supporting guide base 12$a$, and a spindle driving motor which is not shown here. Rails 14, 14 fixed on the front side face plate 11$a$ are guiding the spindle device 12 up and down by means of the supporting guide base 12$a$. The spindle device 12 is actuated up and down by an unshown driving device.

The above means such as thickening components or adding reinforcing ribs to increase rigidity have a high cost. Therefore, recently outer peripheries of base components are surrounded by plates, and then concrete is filled therein. Or, concrete blocks are fixed to required parts afterwards.

In a small machine tool, it is easy to surround outer peripheries of a base with plates and fill concrete therein. However, in a big machine tool, it is troublesome or sometimes rather unsuitable. Besides, as years go by, concrete is constricted due to water evaporation, and breaks away from the plates, thereby decreasing rigidity as well as causing noise.

Moreover, fixing concrete blocks afterwards is generally troublesome. Besides, as described above, concrete changes as years go by, thereby distorting a structure and decreasing machine accuracy.

On the other hand, as shown in FIGS. 11A and 11B, there is a column wherein slits s, s are formed at front and back longitudinal side faces 11$a$, 11$b$, respectively, and wherein a spindle 12$b$ is mounted across the slits s, s so as to move up and down.

FIG. 11A is a perspective view of a column to which a spindle is mounted, and FIG. 11B is a horizontal cross sectional view of the upper part of the column.

In the column shown in these figures, the front and back longitudinal side faces 11$a$, 11$b$ can not keep strong rigidity, and the connection between right and left longitudinal side faces 11$c$, 11$d$ seems to break away, thereby causing a lack of rigidity of the whole column.

SUMMARY OF THE INVENTION

Objects of this invention are therefore to propose a spindle supporting box structure and a damping structure for machine tools which can overcome the above problems, and to provide a gas supply related device and a balance cylinder gas actuated device in close relation with these structures.

To achieve the above objects, a spindle supporting box structure for machine tools according to the first invention is characterized as follows.

Namely, longitudinal parts forming both ends of lateral parts at each of right and left longitudinal side faces facing, with a spindle there-between, in a direction almost perpendicular to longitudinal side faces facing in a front-back direction are formed by longitudinal tubular members having suitable flexural rigidity. Accordingly, the tubular members increase the whole rigidity effectively because of epistasis of their locations.

In this case, lateral tubular members may be connected to the longitudinal tubular members in front-back and right-left directions. This can provide a relatively easy structure whose inner space can be seen from the outside.

Besides, right and left longitudinal side faces facing, with a spindle therebetween, in a direction almost perpendicular to longitudinal side faces facing in a front-back direction may be formed by closely connecting longitudinal tubular members in a line. The longitudinal tubular member has almost the same length as the height of the longitudinal side face. According to this, the longitudinal side faces can be formed by only tubular members relatively easily, thereby effecting an easy structure on the whole as well as increasing rigidity.

Furthermore, it is preferable that a longitudinal tubular member at longitudinal side faces has a geometric cross section such as a circle and a square; and that the tipical size of the cross section (the front-back or right-left width size) is about 1/7 to 1/4 of the front-back or right-left length of the spindle supporting box structure.

According to this, the tubular members can be easily produced, and the longitudinal side faces can be formed in suitable size with less tubular members, thereby effecting easy assembling.

Next, in a damping structure for machine tools according to the second invention, a required framework of a structural unit such as the above spindle supporting box structure is formed by tubular members. Concrete is filled in the tubular members, and then solidified.

In this invention, concrete filled in the tubular members increase rigidity of the tubular members. If concrete is airtightly filled in the tubular member over the full section thereof, concrete increase rigidity of the tubular member a great deal, thereby effecting an increase of rigidity on the whole structure.

Since concrete is filled in required tubular members, a conventional work to srround the structure with plates is unnecessary in order to fill concrete. Besides, concrete can be filled in the tubular members at any time before or after assembling the tubular members. Moreover, concrete can be filled in only necessary parts, thereby bringing a damping effect with less concrete.

In the above invention, it is preferable to fill and seal concrete in the tubular members airtightly.

According to this, concrete is isolated from the outside by the tubular members, thereby causing no water evaporation and moisture absorption in the tubular members as well as preventing constriction and quality change of concrete as years go by. Accordingly, concrete does not break away from walls of the tubular members, thereby causing no noise and distortion of the tubular members.

In the third invention, a powdery damping material or a jelly damping material is airtightly filled in the tubular members instead of the above concrete.

According to this, though the damping material does not increase rigidity of the tubular members as much as concrete, the damping material can bring the same effect as concrete in preventing vibrations of the tubular members, because of its mass, non-compressibility, and frictional force. Besides, since the damping material keeps flowability forever, it can be easily taken out at a necessary time.

In a gas related supply device according to the forth invention, a framework functioning as a reinforcing member of a structure for a machine tool is formed by tubular members, and an inner space of the tubular member is made into a gas pressurized space.

Then, a gas pressurized tank is connected with a gas actuated device by means of a gas passage means.

According to this, when the gas actuated device requires or consumes an excessive amount of gas in a short period, and becomes short of gas supply from a gas supply unit located far from the machine tool, the gas stored in the gas pressurized tank located close to the gas actuated device supplements the gas shortage. Therefore, the gas actuated device can function as originally.

As a concrete example of this invention, a gas pressurized tank can be connected with a balance cylinder by way of a gas passage tube for passing gas without any balance pressurized control valve. In this case, the gas at fixed pressure (inactive gas such as nitrogen as well as air) acts on the balance cylinder by way of the gas passage tube. Because the amount of the gas in the gas pressurized tank is fairly larger than the capacity of the balance cylinder during operation of the balance cylinder, the gas pressure acting on a cylinder room of the balance cylinder does not change in a great deal even without any balance pressurized control valve.

In this case, a balance pressurized control valve can be provided in the middle of the above gas passage tube.

Furthermore, in a balance cylinder gas actuated device according to the fifth invention, a balance cylinder is installed to the above gas pressurized tank, and the gas in the gas pressurized tank directly acts on a cylinder room of the balance cylinder.

According to this, no gas passage tube is necessary, thereby effecting smooth flow of the gas into the cylinder room of the balance cylinder without resistance of the gas passage tube.

BRIEF DESCRIPTION OF THE DRAWINGS

FIG. 10 shows a conventional box structure:

FIG. 11 shows a modified conventional box structure:

DETAILED DESCRIPTION OF PREFERRED EMBODIMENT

An explanation follows with FIGS. 1 to 9.

Figure 1:
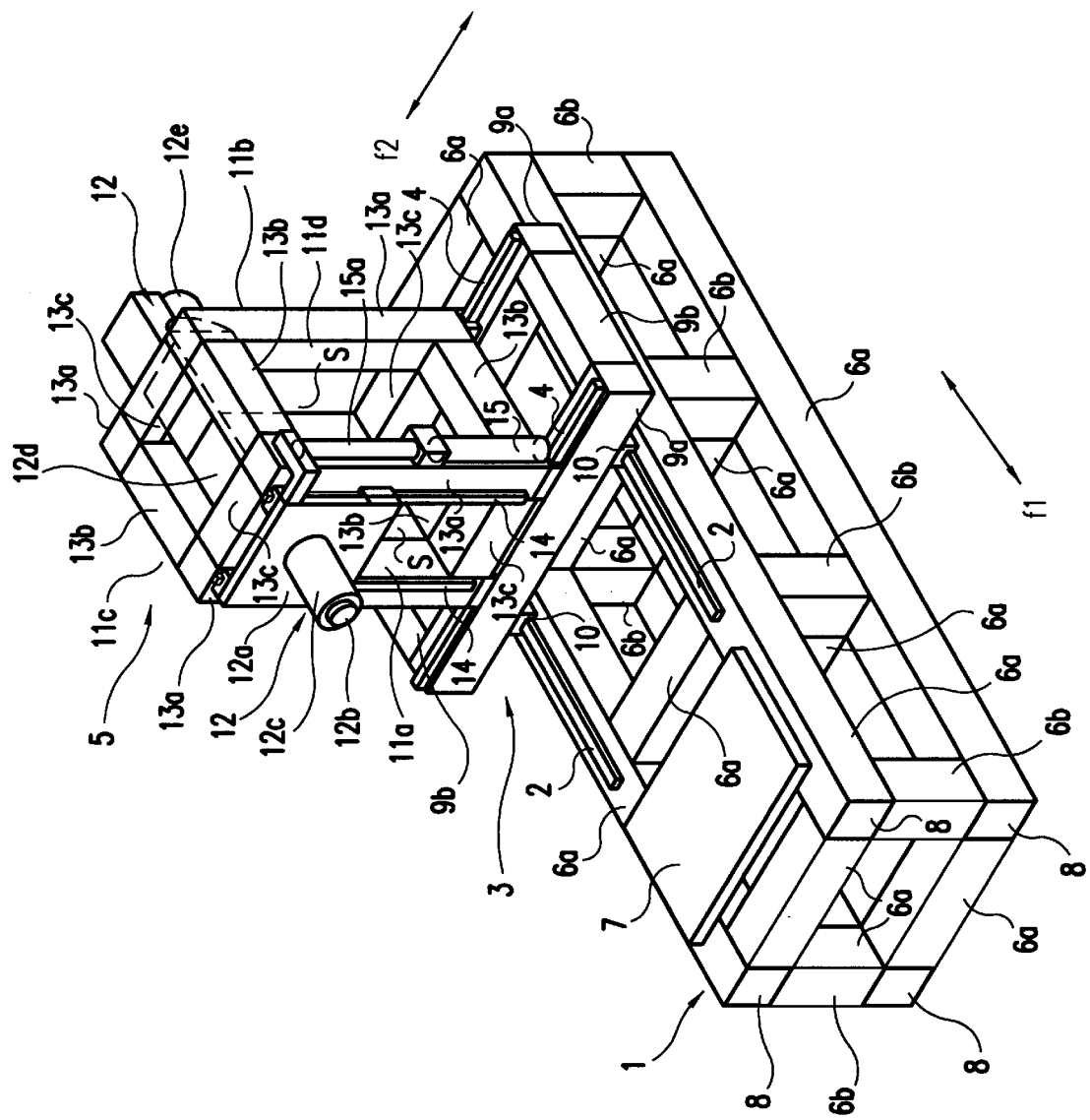
FIG. 1 shows a framework structure of a machine tool according to this invention.

FIG. 1 shows a framework of a damping structure for machine tools according to this invention. As a whole, a plurality of structural units, each made into a damping structure, are connected with each other.

Specifically, the framework comprises a base unit 1 disposed at the bottom, a delivery unit 3 guided slidably in a front-back direction f1 by means of rails 2, 2 fixed on the base unit 1, and a column unit 5 guided slidably in a right-left direction f2 by means of rails 4, 4 fixed on the delivery unit 3.

An explanation for each unit follows.

Namely, in the base unit 1, lateral (front-back and right-left directions) tubular members 6a and longitudinal tubular members 6b are assembled to form a rectangle as a whole, and a base plate 7, and the rails 2, 2 are fixed thereon.

In this assembling process, concrete is filled in the lateral tubular members 6a in horizontal position before assembling, while concrete is filled in the longitudinal tubular members 6b during assembling. Therefore, filling concrete can be easily achieved.

As the tubular members 6a, 6b, it is preferable to use steel products which are on the market and whose cross sections are square. The size of the cross section should be chosen according to required rigidity in consideration for an easy concrete filling.

Here, concrete is in a wide sense. Namely, it includes cement concrete, cement mortar, cement paste, plastic concrete, and asphalt concrete. Concrete may be filled in the tubular members 6a, 6b over the full or partial length. In either case, concrete is filled over the full cross section of a filled part.

It is most preferable to airtightly seal ends of the tubular members 6a, 6b, which are filled with concrete with lids 8, and to cut off solidified concrete from outside air. This can prevent water evaporation in concrete as well as quality change of concrete due to contact with air as years go by.

In the delivary unit 3, a pair of lateral tubular members 9a in a right-left direction f2 and a pair of vertical tubular members 9b in a front-back direction f1 are assembled to form a rectangle as a whole, and the rails 4, 4 are fixed thereon, while sliding members 10 guided by the other rails 2, 2 are fixed thereunder.

As described above, the tubular members 9a, 9b are filled with concrete.

The column unit 5 as the following structure.

Figure 2:
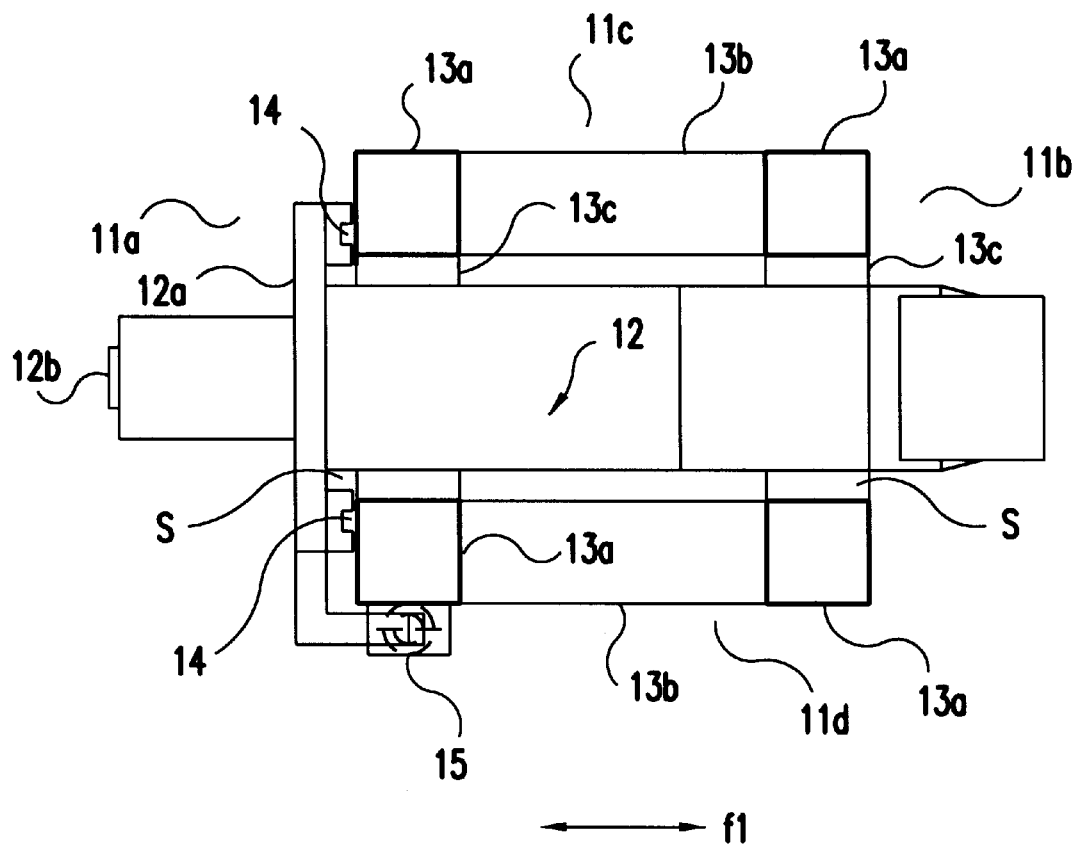
FIG. 2 is a horizontal cross sectional view of the upper part of a box structure in FIG. 1.

Namely, it is explained with FIG. 1 and FIG. 2. FIG. 2 is a horizontal cross sectional view of the upper part of the column 5. As shown in these figures, the column unit 5 is in a box form, provided with a slit s for having a spindle device 12 across thereon at each of longitudinal side faces 11a, 11b, facing in a front-back direction f1.

Then, the spindle device 12 is disposed across the slits s, s.

The spindle device 12 comprises a supporting guide plate 12a, a spindle 12b horizontally fixed to the supporting guide plate 12a, spindle cases 12c, 12d surrounding the spindle 12b, and a spindle driving motor 12e fixed at the back of the spindle case 12d.

Right and left longitudinal side faces 11c, 11d face toward to each other with the spindle therebetween in a direction almost perpendicular to the longitudinal side faces 11a, 11b which face toward each other in a front-back direction f1. The right and left longitudinal side faces 11c, 11d are formed by tubular members 13a, 13b having suitable flexural rigidity, respectively.

The following is a more concrete explanation of the unit 5. Longitudinal parts forming both ends of lateral parts at each of right and left longitudinal side faces 11c, 11d are formed by longitudinal tubular members 13a over the full height of the longitudinal side faces 11c, 11d.

Upper and lower ends of the tubular members 13a, 13a are connected in front-back and right-left directions with lateral tubular members 13b, 13c having the suitable cross sectional size.

The typical cross sectional size of the longitudinal tubular member 13a (the front-back or right-left width size) is about 1/7 to 1/4 of the front-back or right-left length of the unit 5.

As described above, each tubular member 13a, 13b, 13c of the unit 5 is filled with concrete according to necessity.

Rails 14, 14 are fixed in front of the tubular members 13a, 13a located at right and left sides of the front longitudinal side face 11a of the unit 5. The supporting guide plate 12a, a part of the spindle device 12, is guided by the rails 14, 14.

A driving device which is not shown here is provided at a suitable part of the unit 5 to move the spindle device 12 up and down with the spindle 12b in horizonal position.

A balance cylinder 15 is fixed to the right tubular member 13a of the front longitudinal side face 11a. A tip of a piston rod 15a of the cylinder 15 is fixed to the supporting guide base 12a. By balancing the sleight of the spindle device 12 with upward force of the piston rod 15a due to fluid pressure in the cylinder 15, the driving device can move the spindle device 12 upward with less force.

The whole framework of the unit 5 is formed by the longitudinal tubular members 13a and the lateral tubular members 13b, 13c, thereby effecting a simple structure on the whole.

Because of epistasis of their locations, four pieces of the longitudinal tubular members 13a increase the rigidity of the unit 5 on the whole more effectively than if they were located close to the center of the longitudinal side faces 11c, 11d in a lateral direction.

As described above, the tipical cross sectional size of the longitudinal tubular member 13a is about 1/7 to 1/4 of the front-back or right-left length of the unit 5. This makes it possible to get required rigidity space economically with less work.

The above unit 5 can be modified as follows.

Figure 3:
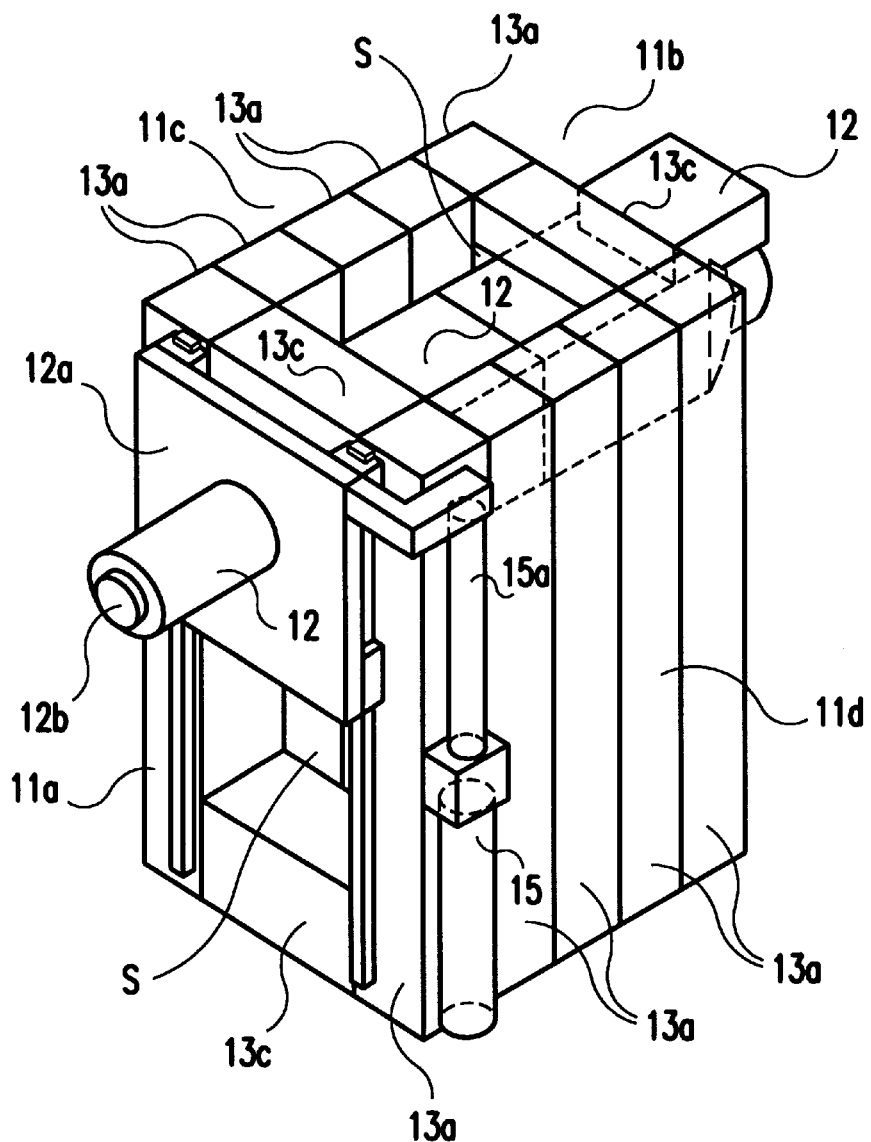
FIG. 3 is a perspective view, showing the first modified example of the above box structure.
Figure 4:
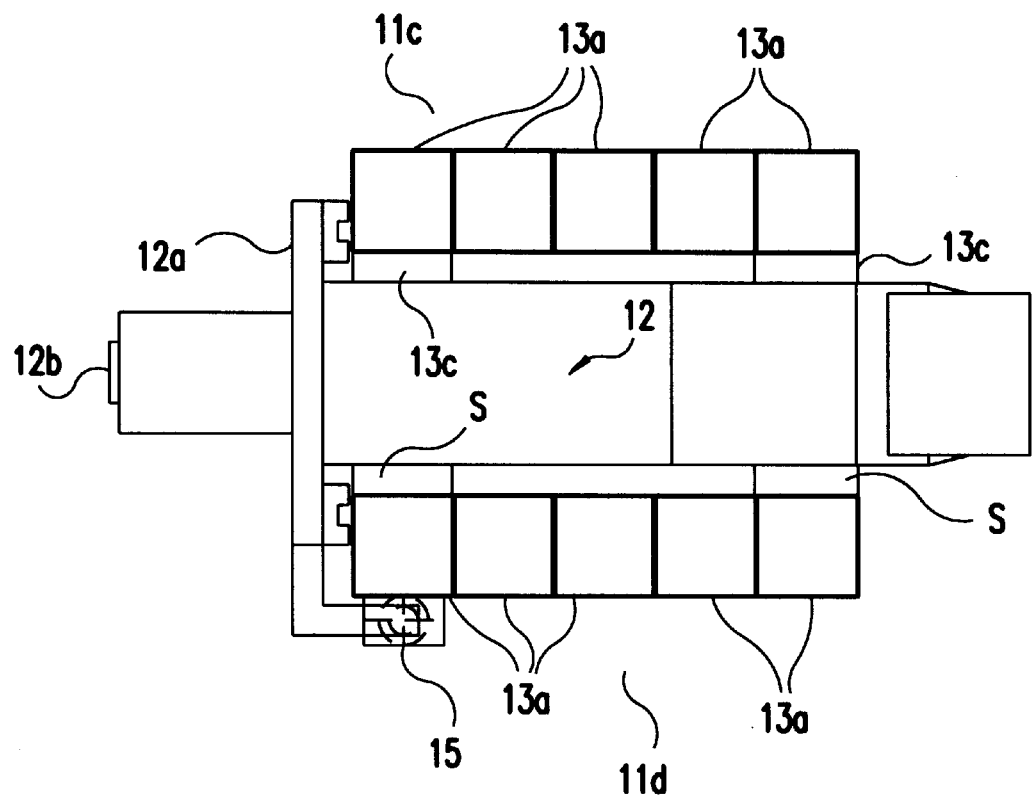
FIG. 4 is a horizontal cross sectional view of the upper part of the box structure in FIG. 3.

Namely, FIG. 3 and FIG. 4 show the first modified example. FIG. 3 is a perspective view of the whole unit 5, and FIG. 4 is a horizontal cross sectional view of the upper part thereof.

In this modified example, the right and left longitudinal side faces 11c, 11d are formed by closely connecting longitudinal tubular members 13a in a line. The length of the longitudinal tubular member 13a is almost the same height as the longitudinal side faces 11c, 11d.

According to this, the longitudinal side faces 11c, 11d can be formed relatively easily by only the tubular members 13a, thereby effecting a simple structure on the whole as well as great rigidity on the whole of the faces.

Figure 5:
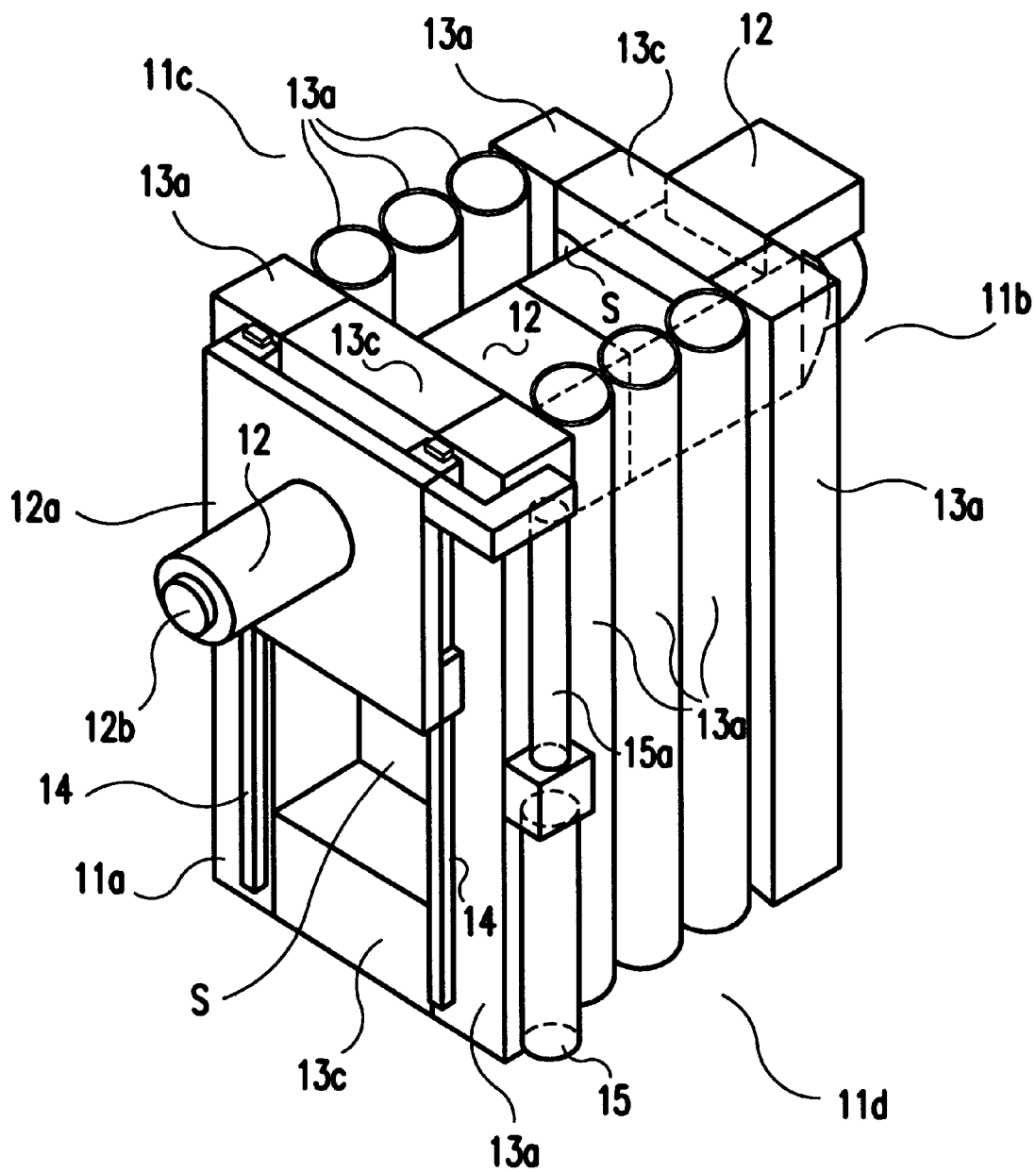
FIG. 5 is a perspective view showing the second modified example of the above box structure.
Figure 6:
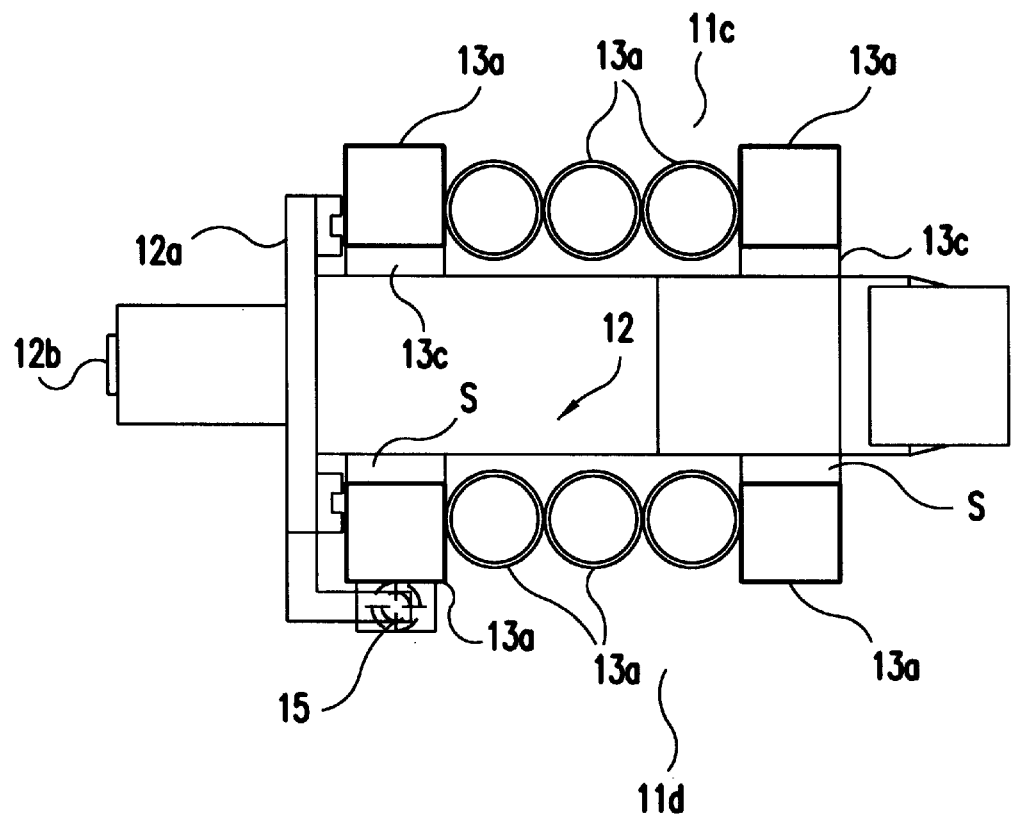
FIG. 6 is a horizontal cross sectional view of the upper part of the box structure in FIG. 5.

FIG. 5 and FIG. 6 show the second modified example. FIG. 5 is a perspective view of the whole unit 5, and FIG. 6 is a horizontal cross sectional view of the upper part thereof.

In this modified example, tubular members 13a having a square cross section are provided at both ends of right and left longitudinal side faces 11c, 11d, while tubular members 13a having a circle cross section are provided therebetween. This can also bring the same effects as the above modified example.

As described above, the tubular members 13a, 13b, 13c in these modified examples are filled with concrete according to necessity.

Though the tubular members in the above examples are filled with concrete, they may be filled with damping materials (sands, etc.) or jelly damping materials (grease, tar, etc.) instead of concrete.

The above mentioned tool machine has further following structures.

Namely, an inner space of specific one (a tubular member 6a, for example) among tubular members 6a, 6b, 9a, 9b, 13a, 13b, 13c of units 1, 3, 5 is made into a gas pressurized tank.

Therefore, the ends of the tubular member 6a to be made into a gas pressurized tank are closed with lids 8. If one tubular member 6a can not provide enough inner capacity, a plurality of tubular members are made into gas pressurized tanks, and their inner spaces are connected with each other.

The gas pressurized tank is optionally or always provided with gas at fixed pressure (air in this example) from a gas supply unit located away from a machine tool.

According to necessity, the units 1, 3, 5 are provided with a variety of gas actuated control devices such as a balance cylinder 15, a linear driving cylinder, a rotary driving cylinder, an air injection system, and an air actuated control device. These control devices are connected with the above gas pressurized tank by way of a suitable gas passage.

Next is an explanation of a concrete example showing connecting conditions.

Figure 7:
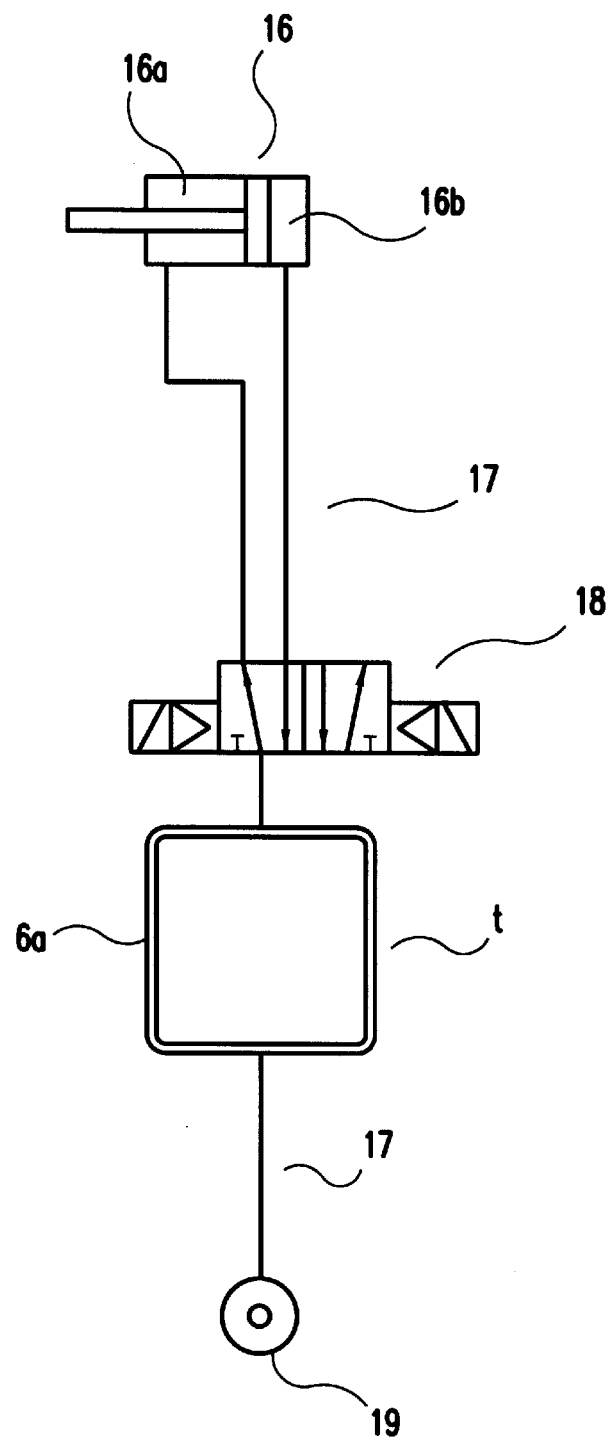
FIG. 7 is an explanatory view showing a concrete example of a gas supply related device according to this invention.

FIG. 7 shows an example of a linear driving cylinder 16 as a gas actuated control device. A gas passage comprises a gas passage tube 17 and a direction changing valve 18. A gas pressurized tank t comprising a tubular member 6a is always provided with air at fixed pressure through the gas passage 17 from a gas supply unit 19. The air is provided to the linear driving cylinder 16 through the the direction changing valve 18. Then, due to functions of the direction changing valve 18, the air in the gas pressurized tank t is supplied to either a cylinder room 16a, or 16b, and the air in the other cylinder room 16b, 16a is discharged outside.

In this example, if the linear driving cylinder 16 functions heavily at a time, the gas supply unit 19 may not be able to supply air to the gas pressurized tank t in time. In this case, the air stored in the gas pressurized tank t supplements the air shortage, and therefore the linear driving cylinder 16 can function without any trouble.

Figure 8C:
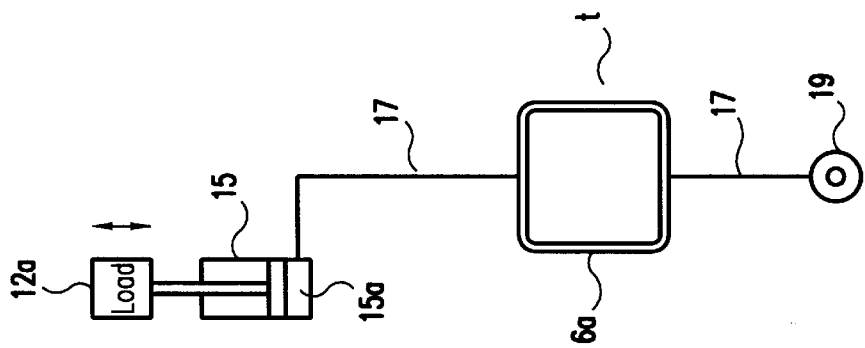
FIG. 8 is an explanatory view, showing another concrete example of the above gas supply related device.
Figure 8B:
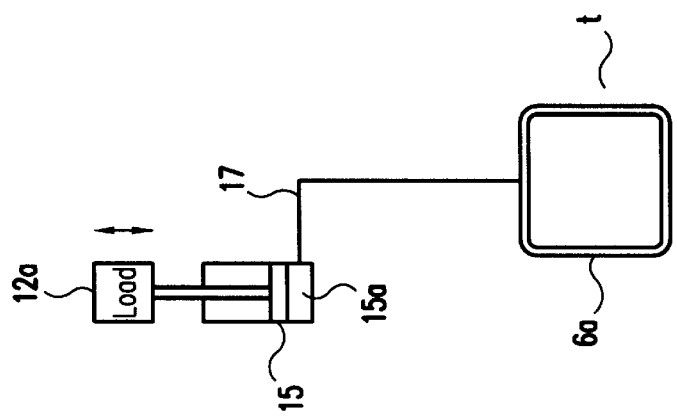
Figure 8A:
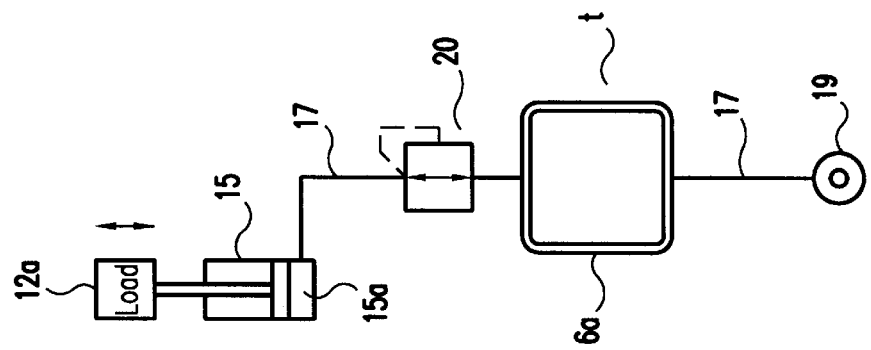
Figure 9:
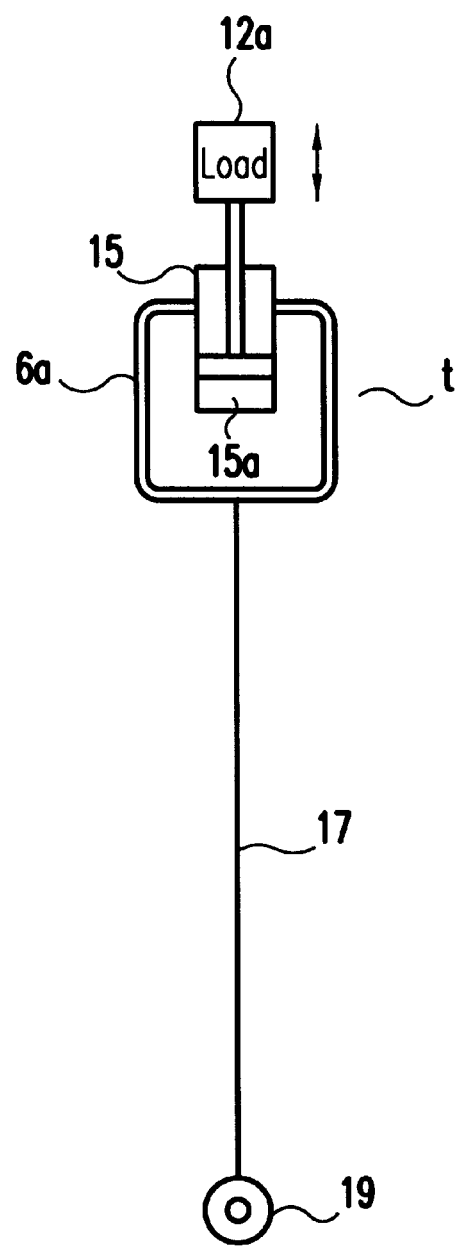
FIG. 9 is an explanatory view, showing a concrete example of a balance cylinder air actuated device according to this invention.
Figure 10B:
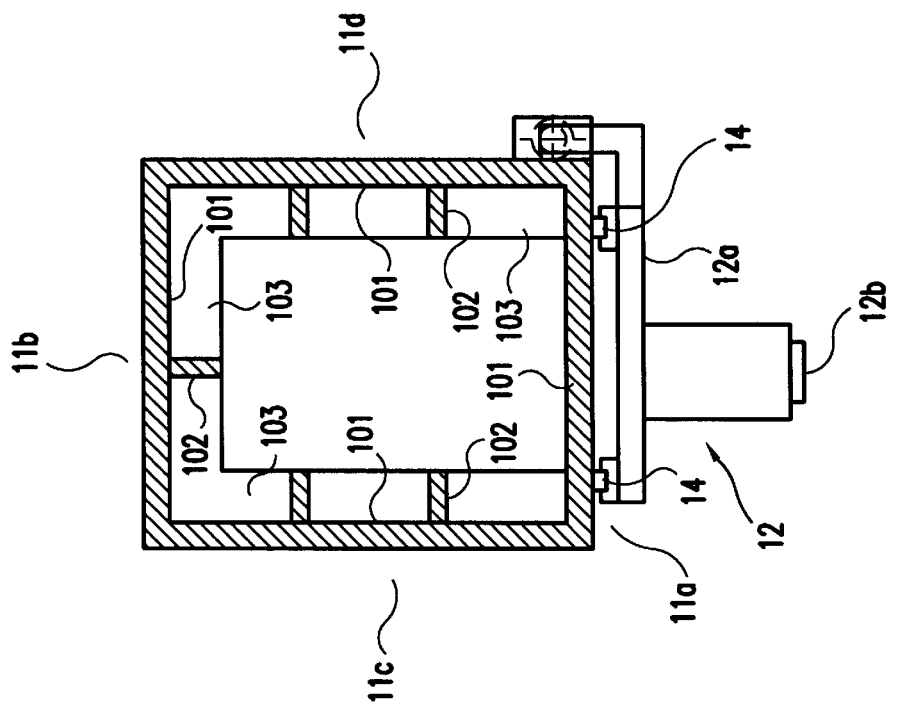
FIG. 10B is a horizontal cross sectional view of the upper part thereof.
Figure 10A:
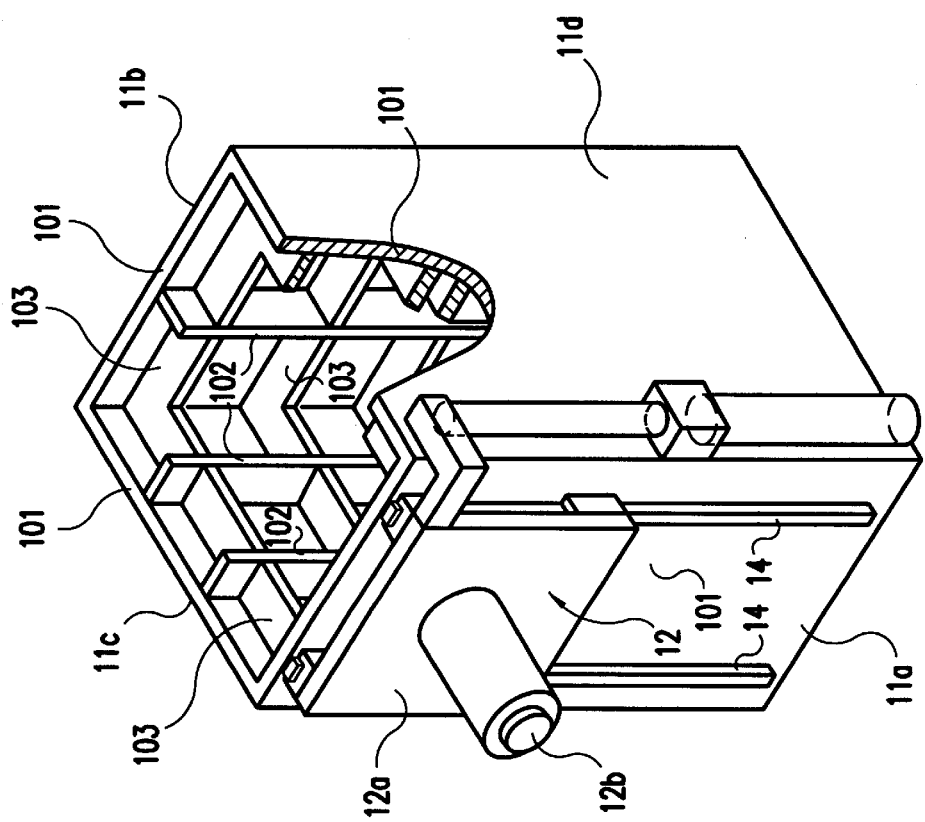
FIG. 10A is a perspective view.
Figure 11B:
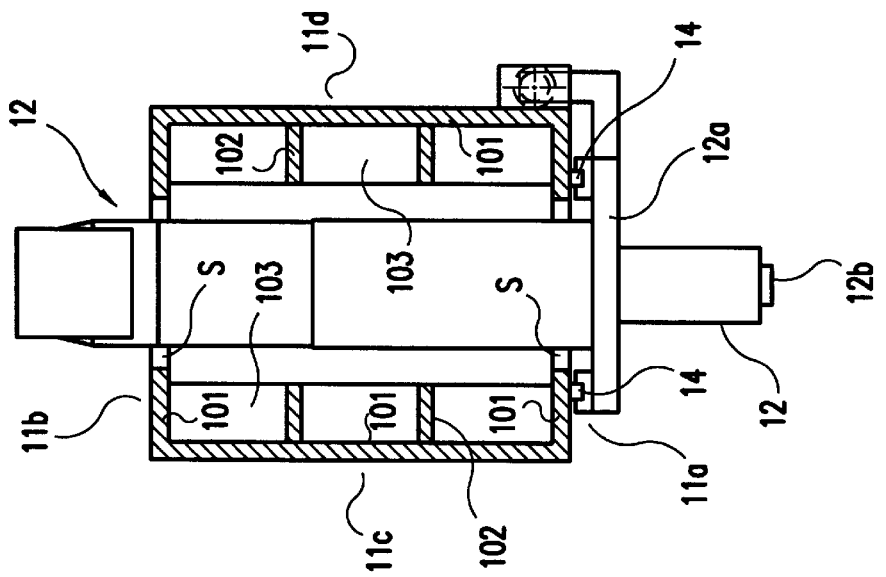
FIG. 11B is a horizontal cross sectional view of the upper part thereof.
Figure 11A:
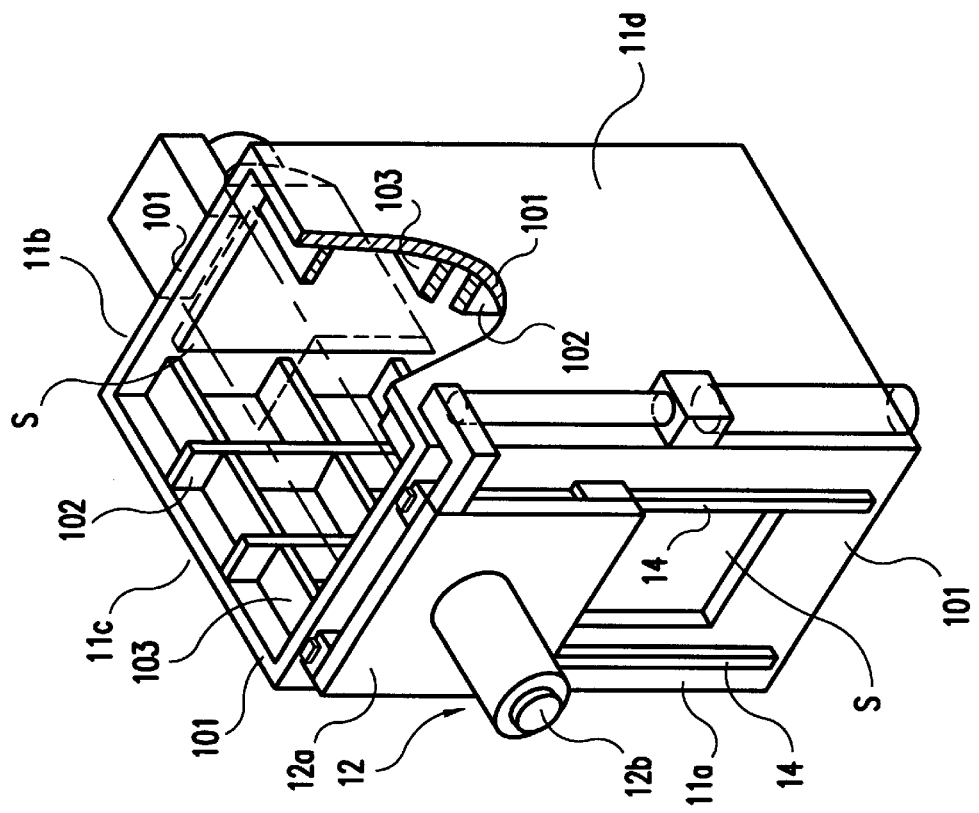
FIG. 11A is a perspective view.

FIG. 8A shows an example of a balance cylinder 15 as a gas actuated control device. A gas passage comprises a gas passage tube 17 and a balance pressurized control valve 20. As described above, a gas pressurized tank t is always provided with air at fixed pressure through the gas passage 17. This air is supplied to the balance cylinder 15 through the balance pressurized control valve 20. When a moving unit (a supporting guide plate 12a) is lowering, the air in a cylinder room 15a is discharged outside through the balance pressurized control valve 20.

In this example, if the moving unit 12a moves up and down heavily at a time, the gas supply unit 19 may not be able to supply air to the gas pressurized tank t in time. In this case again, the air stored in the gas pressurized tank t supplements the air shortage, and therefore the balance cylinder 15 can function without any trouble.

FIG. 8B shows an example of a balance cylinder 15 as a gas actuated control device. Here, a gas passage comprises only a gas passage tube 17 for merely passing gas. The size of a gas pressurized tank t is bigger than than the size of the balance cylinder 15 and a cylinder room 15 at a fixed ratio. The air at fixed pressure is optionally supplied into the gas pressurized tank t through the air passage from a gas supply unit. On use of the device, first the air is filled in the gas pressurized tank t from the gas supply unit, and thereafter an operator manually supplies the air if the air pressure goes down.

In this example, when a moving unit 12a moves up and down, the air in the cylinder room 15a is supplied from the gas pressurized tank t, or flowed into the gas pressurized tank t conversely. The air consumption due to functions of the balance cylinder 15 only happens when the air leaks from a gap. During working of the balance cylinder 15, the air pressure hardly changes, because the capacity of the gas pressurized tank t is relatively large. Therefore, practically the balance cylinder 15 functions without any trouble.

In this example, as shown in FIG. 8C, the air from the gas supply unit 19 may be always supplied to the gas pressurized tank t to supplement a pressure decrease in the gas pressurized tank t automatically.

Besides, inactive gas such as nitrogen or other gas may be filled in the gas pressurized tank t instead of air. In this case, inactive gas can prevent corrosion of inner surfaces of the cylinder room 15a, the gas pressurized tank t, and the gas passage tube 17.

FIG. 9a shows a modified example of the one shown in FIG. 8C. A cylinder body of a balance cylinder 15 is fixed to a gas pressurized tank t without any gas passage means such as a gas passage tube 17. The inside of the gas pressurized tank t is connected with a cylinder room 15a of the balance cylinder 15. In this case, when a moving body 12a moves up or down, the air is directly supplied into the cylinder room 15a from the gas pressurized tank t, or directly flowed into the gas pressurized tank t. Accordingly, during working of the balance cylinder 15, there is no flow resistance in the gas passage tube 17, thereby effecting smooth operation of the balance cylinder 15.

In this example again, the air may be always supplemented to the gas pressurized tank t from the gas supply unit 19 so as to supplement a pressure decrease in the gas pressurized tank t automatically.

In all the above figures, the same reference number is given to, practically, the same part.

EFFECTS OF THE PRESENT INVENTION

According to the present invention as set forth in claim 1, tubular members can increase rigidity of right and left longitudinal side faces where slits are formed to install a spindle. Accordingly, necessary rigidity can be easily obtained on the whole structure, thereby preventing vibrations.

Because of epistasis of their locations, tubular members increase rigidity on the whole structure effectively. Each corner can be formed by only connecting tubular members, or by a similar easy strucutre. Besides, an inner space can be seen from the outside.

Longitudinal side faces can be formed by only tubular members relatively easily, and rigidity of the whole longitudinal side faces can increase, thereby increasing rigidity of the whole structure more.

Each longitudinal side face can be formed by a few tubular members, and therefore assembled easily. Besides, a space having a suitable width can be obtained at the longitudinal side face to support and guide a spindle.

Tubular members are filled with concrete. Therefore, even in a big machine tool, concrete can be easily filled at any time without forming a fence for concrete. Besides, less concrete can bring a damping effect.

Concrete is airtightly sealed in the tubular members, thereby preventing constriction and quaility change of concrete as years go by. Accordingly, there is no noise or distortion due to constriction and quality change of concrete. Besides, machine accuracy can be suitably obtained for a long time.

A powdery damping material or a jelly damping material can function as concrete, and bring the same effects as the above. Since these damping materials keep flowability forever, they can be easily taken out according to necessity, thereby effecting an easy repair.

A tubular member as a reinforcing member is used as a gas pressurized tank. It is more economical than a machine tool provided with a gas pressurized tank separately. Besides, the gas pressurized tank is located close to a gas required place. Therefore, even when the gas required place becomes temporalily short of gas supply from a gas supply unit, the gas stored in the gas pressurized tank is immediately supplied to the gas required place to supplement the gas shortage, thereby causing no large device.

When a gas actuated device becomes short of gas supply, it is compensated as described above.

Since there is no gas consumption besides leakage from a balance cylinder, the balance cylinder can be smoothly actuated with less flow of pressurized gas. Besides, inactive gas such as nitrogen can be used. In this case, the inactive gas can prevent corrosion of walls surrounded by the gas.

The gas in a gas pressurized tank located close to a balance cylinder is supplied to the balance cylinder by way to a balance pressurized control valve. Therefore, even when the balance cylinder becomes temporalily short of gas supply from a gas supply unit, the gas shortage is supplemented as described above.

Besides, since there is no gas passage tube, no flow resistance happens, thereby effecting smoother and steadier operation of a balance cylinder.

I claim:

1. A spindle supporting box structure for machine tools:
   wherein a slit is provided at each of longitudinal side faces facing in a front-back direction;

wherein a spindle is installed across the slits to move up and down;

wherein each of right and left longitudinal side faces facing in a direction almost perpendicular to the above longitudinal side faces with the spindle therebetween is formed by tubular members having suitable flexural rigidity; and wherein a powdery damping material or a jelly damping material is airtightly sealed in the tubular members.

2. A spindle supporting box structure for machine tools as set forth in claim 1:

wherein longitudinal parts forming both ends of lateral parts at each of right and left longitudinal side faces facing, with a spindle therebetween, in a direction almost perpendicular to longitudinal side faces facing in a front-back direction are formed by longitudinal tubular members having suitable flexural rigidity.

3. A spindle supporting box structure for machine tools as set forth in claim 1:

wherein longitudinal parts forming both ends of lateral parts at each of right and left longitudinal side faces facing, with a spindle therebetween, in a direction almost perpendicular to longitudinal side faces facing in a front-back direction are formed by longitudinal tubular members having suitable flexural rigidity; and wherein lateral tubular members are connected to the longitudinal tubular members in front-back and right-left directions.

4. A spindle supporting box structure for machine tools as set forth in claim 1:

wherein right and left longitudinal side faces facing, with a spindle therebetween, in a direction almost perpendicular to longitudinal side faces facing in a front-back direction are formed by closely connecting longitudinal tubular members in a line, said longitudinal tubular members having almost the same length as the height of the longitudinal side faces.

5. A spindle supporting box structure for machine tools:

wherein a slit is provided at each of longitudinal side faces facing in a front-back direction;

wherein a spindle is installed across the slits to move up and down;

wherein each of right and left longitudinal side faces facing in a direction approximately perpendicular to the above longitudinal side faces, with the spindle therebetween, is formed by tubular members having suitable flexural rigidity;

wherein a longitudinal tubular member at the longitudinal side faces has a geometric cross section; and wherein the typical size of the cross section is about 1/7 to 1/4 of the front-back or right-left length of the spindle supporting box structure.

6. A damping structure for machine tools:

wherein a required framework of a structure is formed by tubular members;

wherein concrete is filled in the tubular members, and then solidified; and wherein the concrete is airtightly sealed in the tubular members.

7. A damping structure for machine tools:

wherein a required framework of a structure is formed by tubular members; and wherein a powdery damping material or a jelly damping material is airtightly sealed in the tubular member.

8. A gas supply related device for machine tools:

wherein a framework functioning as a reinforcing member of a structure is formed by tubular members;

wherein an inner space of the tubular members is made into a gas pressure space;

wherein a gas pressurized tank is connected with a gas actuated device by means of a gas passage means;

wherein the gas actuated device is a balance cylinder;

wherein the gas pressure means is a gas passage tube for passing gas; and wherein a balance pressurized control valve is provided in the middle of the gas passage tube.

9. A balance cylinder gas actuated device for a machine tool having a framework formed by tubular members comprising:

a gas pressurized tank;

a balance cylinder defining a cylinder chamber; and a gas passage connecting said gas pressurized tank with said balance cylinder chamber such that gas in the gas pressurized tank directly acts on the cylinder chamber, wherein one of the tubular members defines the gas pressurized tank.

10. A spindle supporting box structure for machine tools comprising:

a box having first opposed faces facing in a front-back direction and second opposed faces facing substantially perpendicular to said first opposed faces;

a slit defined in each of said first opposed faces; and a spindle device mounted on said box for up and down movement, said spindle device extending through each of said slits, wherein each of said second opposed faces has sides defined by first flexurally rigid tubular members.

11. A spindle supporting box structure for machine tools as set forth in claim 10, wherein each of said second opposed faces further has second flexurally rigid tubular members extending substantially perpendicular to and connecting said first flexurally rigid tubular members.

12. A spindle supporting box structure for machine tools as set forth in claim 10, further comprising third flexurally rigid tubular members connecting said second opposed faces to one another.

13. A spindle supporting box structure for machine tools as set forth in claim 10, wherein each of said second opposed faces is defined by a plurality of said first flexurally rigid tubular members, wherein said tubular members are parallel to one another and connected to one another.

14. A spindle supporting box structure for machine tools as set forth in claim 10:

wherein each said tubular member has a geometric cross section such as a circle or a square; and wherein the width of each said tubular member is about 1/7 to 1/4 of one of said first or second opposed faces of the box.

15. A spindle supporting box structure for machine tools as set forth in claim 10:

wherein one of said tubular members defines a gas pressurized space;

wherein the gas pressurized space is connected with a gas actuated balance cylinder by a gas passage; and wherein a balance pressurized control valve is provided in the gas passage.

* * * * *